United States Patent
Baert et al.

(10) Patent No.: US 11,053,695 B2
(45) Date of Patent: Jul. 6, 2021

(54) PANEL SUITABLE FOR ASSEMBLING A WATERPROOF FLOOR OR WALL COVERING, METHOD OF PRODUCING A PANEL

(71) Applicant: Champion Link International Corporation, The Valley (AI)

(72) Inventors: Thomas Luc Martine Baert, Sint-Martens-Latem (BE); Anthony Drevet, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 16/489,657

(22) PCT Filed: Feb. 28, 2018

(86) PCT No.: PCT/EP2018/054972
§ 371 (c)(1),
(2) Date: Aug. 28, 2019

(87) PCT Pub. No.: WO2018/158338
PCT Pub. Date: Sep. 7, 2018

(65) Prior Publication Data
US 2019/0383031 A1  Dec. 19, 2019

(30) Foreign Application Priority Data
Feb. 28, 2017 (NL) .................................. 2018440

(51) Int. Cl.
*E04F 15/10* (2006.01)
*B32B 3/06* (2006.01)
(Continued)

(52) U.S. Cl.
CPC .............. *E04F 15/107* (2013.01); *B32B 3/06* (2013.01); *B32B 5/18* (2013.01); *B32B 7/02* (2013.01);
(Continued)

(58) Field of Classification Search
CPC . E04F 15/107; E04F 13/0866; E04F 13/0894; E04F 15/02038;
(Continued)

(56) References Cited

U.S. PATENT DOCUMENTS 4,614,680 A * 9/1986 Fry ........................... B32B 3/30
428/158
5,153,388 A * 10/1992 Wittenmayer ............ B32B 5/18
181/290
(Continued)

FOREIGN PATENT DOCUMENTS

EP  3020885 A1  5/2016
EP  3115194 A1  1/2017
(Continued)

OTHER PUBLICATIONS

ISA European Patent Office, International Search Report and Written Opinion Issued in Application No. PCT/EP2018/054972, dated Mar. 23, 2018, WIPO, 12 pages.

*Primary Examiner* — Joshua K Ihezie
(74) *Attorney, Agent, or Firm* — McCoy Russell LLP

(57) ABSTRACT

Panel suitable for assembling a waterproof floor or wall covering from a plurality of said panels, wherein the panel has a substantially planar top surface, and a substantially planar bottom surface,
the panel having a laminated structure of layers which comprises:
a flexible core layer which basically is composed of a material which is relatively low in density and is provided with voids in the form of air pockets, and
(Continued)

a rigid top layer which comprises a support layer that is basically composed of a material that is relatively high in density and which is virtually devoid of air pockets, wherein the thickness of the core layer is smaller than the thickness of the support layer, preferably in a ratio of 0.5 or less, more preferably in a ratio between 0.5 and 0.10.

19 Claims, 3 Drawing Sheets

(51) Int. Cl.
| | | |
|---|---|---|
| *B32B 5/18* | (2006.01) | |
| *B32B 7/02* | (2019.01) | |
| *B32B 27/06* | (2006.01) | |
| *B32B 27/10* | (2006.01) | |
| *B32B 27/18* | (2006.01) | |
| *B32B 27/30* | (2006.01) | |
| *E04F 13/08* | (2006.01) | |
| *E04F 15/02* | (2006.01) | |

(52) U.S. Cl.
CPC ............ *B32B 27/065* (2013.01); *B32B 27/10* (2013.01); *B32B 27/18* (2013.01); *B32B 27/304* (2013.01); *E04F 13/0866* (2013.01); *E04F 13/0894* (2013.01); *E04F 15/02038* (2013.01); *B32B 2255/10* (2013.01); *B32B 2255/12* (2013.01); *B32B 2255/26* (2013.01); *B32B 2264/104* (2013.01); *B32B 2266/025* (2013.01); *B32B 2266/0221* (2013.01); *B32B 2266/06* (2013.01); *B32B 2266/08* (2013.01); *B32B 2307/7265* (2013.01); *B32B 2471/00* (2013.01); *B32B 2607/02* (2013.01); *E04F 2201/0153* (2013.01); *E04F 2201/023* (2013.01); *E04F 2201/043* (2013.01)

(58) Field of Classification Search
CPC ........ E04F 2201/0153; E04F 2201/023; E04F 2201/043; B32B 3/06; B32B 5/18; B32B 7/02; B32B 27/065; B32B 27/10; B32B 27/18; B32B 27/304; B32B 2255/10; B32B 2255/12; B32B 2255/26; B32B 2264/104; B32B 2266/0221; B32B 2266/025; B32B 2266/06; B32B 2266/08; B32B 2307/7265; B32B 2471/00; B32B 2607/02; B32B 2260/028; B32B 2264/10; B32B 2264/101; B32B 2266/0235; B32B 2307/10; B32B 2307/546; B32B 2307/558; B32B 29/002

See application file for complete search history.

(56) References Cited

U.S. PATENT DOCUMENTS

| | | | |
|---|---|---|---|
| 7,603,824 B1 * | 10/2009 | Hartanto | E04F 15/022 |
| | | | 52/309.4 |
| 9,212,494 B2 * | 12/2015 | Meersseman | B32B 7/02 |
| 10,024,066 B2 * | 7/2018 | Dossche | B32B 7/12 |
| 2004/0265568 A1 * | 12/2004 | Crane | B32B 27/065 |
| | | | 428/318.6 |
| 2005/0208255 A1 * | 9/2005 | Pervan | E04F 15/041 |
| | | | 428/60 |
| 2006/0096205 A1 * | 5/2006 | Griffin | B29C 44/24 |
| | | | 52/309.4 |
| 2006/0179749 A1 * | 8/2006 | Brandt | B32B 29/007 |
| | | | 52/309.7 |
| 2008/0138560 A1 * | 6/2008 | Windmoller | B32B 3/02 |
| | | | 428/46 |
| 2008/0280134 A1 * | 11/2008 | Kleba | B32B 27/18 |
| | | | 428/337 |
| 2009/0098357 A1 * | 4/2009 | Bergtold | B32B 27/20 |
| | | | 428/218 |
| 2009/0308001 A1 * | 12/2009 | Wu | E04C 2/326 |
| | | | 52/173.3 |
| 2012/0276348 A1 * | 11/2012 | Clausi | B32B 29/002 |
| | | | 428/196 |
| 2013/0009332 A1 * | 1/2013 | Goedecke | B29C 70/46 |
| | | | 264/46.5 |
| 2013/0104485 A1 | 5/2013 | Meersseman et al. | |
| 2015/0375471 A1 * | 12/2015 | Song | E04F 15/105 |
| | | | 428/159 |
| 2017/0225428 A1 * | 8/2017 | Muir | B32B 37/06 |
| 2018/0015688 A1 * | 1/2018 | Park | B32B 27/28 |
| 2018/0216352 A1 * | 8/2018 | Hensiek | E04F 13/0866 |
| 2018/0298621 A1 * | 10/2018 | Courey | E04F 15/02038 |
| 2018/0311929 A1 * | 11/2018 | Mason | B32B 7/022 |

FOREIGN PATENT DOCUMENTS

| | | |
|---|---|---|
| WO | 2015170274 A1 | 11/2015 |
| WO | 2017046693 A1 | 3/2017 |

* cited by examiner

PANEL SUITABLE FOR ASSEMBLING A WATERPROOF FLOOR OR WALL COVERING, METHOD OF PRODUCING A PANEL

CROSS-REFERENCE TO RELATED APPLICATIONS

The present application is a U.S. National Phase of International Patent Application Serial No. PCT/EP2018/054972 entitled "PANEL SUITABLE FOR ASSEMBLING A WATERPROOF FLOOR OR WALL COVERING, METHOD OF PRODUCING A PANEL," filed on Feb. 28, 2018. International Patent Application Serial No. PCT/EP2018/054972 claims priority to Dutch Patent Application No. 2018440 filed on Feb. 28, 2017. The entire contents of each of the above-referenced applications are hereby incorporated by reference for all purposes.

TECHNICAL FIELD

The invention relates in a first aspect, to a panel suitable for assembling a waterproof floor or wall covering from a plurality of said panels, wherein the panel has a substantially planar top surface, and a substantially planar bottom surface,
the panel having a laminated structure of layers which comprises:
a flexible core layer which basically is composed of a material which is provided with voids in the form of air pockets and hence is relatively low in density, and
a rigid top layer which comprises a support layer that is basically composed of a material that is virtually devoid of air pockets and hence is relatively high in density,
and wherein the core layer has a lower density than the top layer.

The invention relates in a second aspect to a method of producing a panel according to the first aspect of the invention.

BACKGROUND AND SUMMARY

In the field of floor and wall coverings, initially panels were developed based on wood materials or derivatives thereof. A major disadvantage however, is the hygroscopic nature of such materials, which reduces its suitability as a waterproof covering, and affects the lifetime and durability of such panels.

As an important alternative, in U.S. Pat. No. 9,212,494 a panel has been proposed based on layers from polyvinyl compounds. The use of such compounds is advantageous as they are water resistant, and are relatively light in weight. The panel as proposed has a laminated structure of layers according to a sandwich type: it comprises a top layer, a substrate layer (actually the central, main layer) and a backing layer. The substrate layer has a relatively low density, and is made from a foamed synthetic material. The top layer and backing layer are of a polyvinyl compound, wherein at least the top layer has a higher density than the substrate layer. Accordingly, the substrate layer has more flexible properties than the top layer which is of a more rigid character.

In this panel the thickness of the substrate layer is of such size, that it allows for the provision of interconnecting profiles of a tongue and groove type which thus form an integral part of the substrate layer.

In regard of the applied density of the substrate layer, US494 teaches to strike a fine balance: on the one hand, the density should be high enough to avoid migration effects relating to any unevenness of the underlying surface being transmitted towards the upper surface of the panel. Furthermore, a too soft character of the layer is to be avoided in order to prevent deformation by forces applied on the upper surface of the panel during its use. Also the propagation of sound becomes an issue in using too soft materials for the panel. On the other hand, the density should not become too high, in order to avoid a too stiff panel that creates sound boxes between the panel and the underlying surface at spots where any unevenness is present. Accordingly, US494 teaches the substrate layer should have a balanced density which lies between 450 and 900 kg/m3.

In terms of its practical properties for the end-user, the panel proposed in US494 does achieve an adequate noise level reduction and sufficient waterproof quality, however other properties of the panel such as rigidity and indentation performance are compromised, to an actually inadequate or unsatisfactorily degree.

In conclusion, when overviewing the panels known from the prior art, still a general need exists in the field to develop a further improved panel which not only has interesting waterproof and acoustic properties, but which in addition has an adequate rigidity and/or resistance to indentation.

In the above context, it is an objective of the invention to meet the above general need, by developing a technical solution which takes away completely or in part, one or more of the disadvantages relating to panels known from the prior art.

The above objective of the invention, is met by the provision of a panel according to the above preamble, wherein the thickness of the core layer is smaller than the thickness of the support layer, preferably in a ratio of 0.5 or less, more preferably in a ratio between 0.5 and 0.10. Most preferably, the ratio is between 0.5 and 0.25.

It has been found by the inventors, that by reducing the thickness of the core layer in comparison to the support layer, it is possible to achieve a panel with adequate waterproof and acoustic properties, which has at the same time a sufficient rigidity and/or an adequate resistance to indentation.

There is moreover an additional technical advantage gained, in that the panel as a whole is less susceptible to deformation, i.e. curling as a result of temperature and humidity cycles it may be subjected to during use is significantly reduced using relatively thin core layers in the panel.

Preferably, in the panel according to the invention, the support layer is directly or indirectly provided onto the top side of the core layer.

For instance, the support layer may be laminated to the core layer by applying sufficient heat and pressure, or alternatively may be glued to one another by applying an adhesive layer in between both layers.

With specific preference, in the panel according to the invention, the core layer has a thickness in the range of 0.5 to 3.0 mm, preferably 0.8 to 1.5 mm.

With further specific preference, in the panel according to the invention, the support layer has a thickness in the range of 2.0 to 8.0 mm, preferably 2.5 to 4.0 mm.

It is noted that in the context of the invention, the maximum overall thickness of the panel lies in the range of 4 to 15 mm, more preferably between 4.5 and 8.0 mm.

In a preferred embodiment of the panel according to the invention, the core layer has a density of 100 up to 300 kg/m3. This density has been found to strike an adequate balance in regard of achieving all the desired properties according to the objective of the invention.

In the panel according to the invention, the intrinsic voids in the material of the core layer may have the form of a closed cell and/or open cell structure.

In particular, it is preferred in the panel according to the invention that the material of the core layer has a foam structure. The foam structure consists basically of a matrix in which closed and/or open cells are present. The foam structure is typically obtained by adding blowing agents to a melt, before it is formed and hardened into its final shape. As the foam structure has a lower density than a solid structure, the weight of the core layer is further reduced which is advantageous for the panel. The foam structure has furthermore the advantage of improved sound dampening properties in comparison to a solid structure.

In a further preferred embodiment of the panel according to the invention, the support layer has a density of at least 1200, more preferably at least 1400, and most preferably at least 1600 kg/m3. Dependent on the specific built-up of the panel, an appropriate density generally lies in the range of 1800 to 2100 kg/m3.

As such, the support layer contributes to a substantial degree to an adequate rigidity and resistance to indentation.

Furthermore, in the panel according to the invention, the support layer has a rigidity of at least 2000 N/mm2 when measured according to the standard EN310.

It is preferred for the panel according to the invention that is has an overall rigidity of at least 2000 N/mm2 when measured according to the standard EN310. Preferably the overall rigidity shall be in the range of 3000-6000 N/mm2, more preferably in the range of 4000-5000 N/mm2 (measured according to the standard EN310).

In the panel according to the invention, it is preferred that the material of the core layer comprises a foam material from polyethylene (PEI, ethylene-vinyl acetate (EVA), polystyrene (PS), polypropylene (PP), polyurethane (PU), or melamine, or alternatively cork.

In the panel according to the invention, it is preferred that the material of the support layer comprises a thermoplastic material, preferably PVC, more preferably PVC that is virtually free from plasticizer and contains CaCO3 as filler material, wherein most preferably CaCO3 is present in a wt. % content of 60.

In a further preferred embodiment of the panel according to the invention, the material of the support layer contains a reinforcing material, such as a fiberglass net or mesh.

As such, the support layer is further strengthened in view of its intended use in the panel according to the invention.

Furthermore in the panel according to the invention, it is preferred that the top layer comprises a wear layer, and a décor layer on top of the support layer, the wear layer being optionally provided with a coating.

These additional layers make the panel more suitable for its intended use as a waterproof floor or wall covering.

The coating may be from a material made from urethane, acrylic or oil compounds, and it is preferably 0.05 to 0.10 mm thick. The wear layer may made from a thermoplastic compound, including PVC; or alternatively from wood, paper or paper impregnated with melamine. The wear layer is preferably 0.15 to 0.50 mm thick. The décor layer is about 0.05 to 3.0 mm thick, and is made from any suitable material amongst others: PVC, wood, paper, paper impregnated with melamine, and cork. Further, the décor layer is provided with a decorative side that may be formed by digital printing.

As commonly applied in top layers of panels, the edges at the top surface may be provided with a bevel that extends over the wear layer.

According to a preferred embodiment, in the panel the bottom side of the core layer is directly or indirectly provided with a backing layer.

The backing layer contributes to evening out any unevenness on the underlying surface on which the panel is laid, and may contribute to the rigidity of the panel. In addition, the backing layer may have additional features such as a grip effect and antibacterial properties.

The backing layer has a preferred thickness of 0.5 to 5.0 mm; more preferably 0.8 to 2.0 mm. The material of the backing layer is a thermoplastic material, wood, paper or paper impregnated with melamine.

Preferably the material of the backing layer is PVC, more preferably a PVC that is virtually free from plasticizer and contains CaCO3 as filler material, most preferably in a wt. % content of 60.

Alternatively, the material of the backing layer may be a flexible vinyl compound with a plasticizer content of at least 5 wt. %.

With particular preference, the panel according to the invention has at least four substantially linear side edges, preferably having a rectangular design.

This design makes the panel most suitable for assembling a floor or wall covering from a plurality of panels.

In the panel according to the invention, is has a special preference that the linear side edges comprise at least one pair of opposite side edges which are provided with interconnecting coupling means for interconnecting one panel within another.

As such a 'floating' covering can be assembled by interconnecting the individual panels with each other at their connecting sides without the need to use additional coupling means such as adhesives.

Preferably the panel according to the invention, comprises two pairs of opposite side edges which are provided with interconnecting coupling means.

When the panel according to the invention is provided with interconnecting coupling means, these preferably comprise a tongue and a groove wherein the tongue is provided on one side edge of one pair of opposite side edges, and the groove is provided on the other side edge of the same pair of opposite side edges. Such a design of coupling means is well-known in the art and has proven highly suitable for panels for floating floors.

Additionally, in the panel according to the invention, it is preferred that the interconnecting coupling means have an interlocking feature which avoids free movement of interconnected panels.

Such an interlocking feature may be a projection and a respective recess provided on the respective opposite side edges by which neighbouring panels interlock with each other.

When the panel according to the invention is provided with interconnecting coupling means, it is preferred that these means are provided as an integral part of the support layer.

As such, the coupling means are made from relatively stiff material which contributes to a secure connection, a robust embodiment of the coupling means, and a relative ease for the end-user in regard of coupling the means together.

Preferably in the panel according to the invention, the core layer and/or the support layer is an extruded sheet material. Such a layer is easily produced, and the extrusion process is suitable for the formation of a sheet having a foam structure—which is a preferred structure for the core layer.

The individual layers constituting the rigid top layer are formed by lamination under high pressure, co-extrusion or calendering.

A special aspect of the invention relates to a waterproof floor or wall covering composed of a plurality of assembled panels, wherein the panels are conform the first aspect of the invention. Such a covering profits from the same advantages as set out already above.

In the case that the panels are provided with interconnecting coupling means, the panels are assembled by interconnecting the interconnecting coupling means from respective neighbouring panels.

In a second aspect, the invention relates to a method of producing a panel according to the first aspect of the invention comprising the steps of:
a) providing a flexible core layer which basically is composed of a material which is relatively low in density and is provided with voids in the form of air pockets;
b) providing a rigid top layer which comprises a support layer that is basically composed of a material that is relatively high in density which is virtually devoid of air pockets;
c) adhering the rigid top layer to the top side of the core layer, preferably by applying an adhesive at the interface of the core and top layer.

characterized in that
the thickness of the core layer is smaller than the thickness of the support layer, preferably in a ratio of 0.5 or less, more preferably in a ratio between 0.5 and 0.10.

The method according to the invention provides a new and expedient way to provide a panel according to the first aspect of the invention.

In consistency therewith, the method according to the second aspect of the invention may include any of the preferred features of the panel according to the first aspect of the invention.

The following dimensions and properties are preferred for the panel according to the invention:
overall thickness of the panel: 4.5 to 8.0 mm
thickness of the rigid top layer approx. 3.0 mm
thickness of the core layer approx. 1.0 mm
thickness of the backing layer approx. 1.0 mm
overall width of the panel: 120-600 mm
overall length of the panel: 300-2500 mm In respect of the core layer being based on a foam material the following properties are preferred:
pore size: 0.01 to 0.5 mm
pore volume: 20 to 50%
density: 100-300 kg/m3

BRIEF DESCRIPTION OF THE FIGURES

The invention will be further explained with reference to the appended figures wherein.

DETAILED DESCRIPTION

Figure 1:
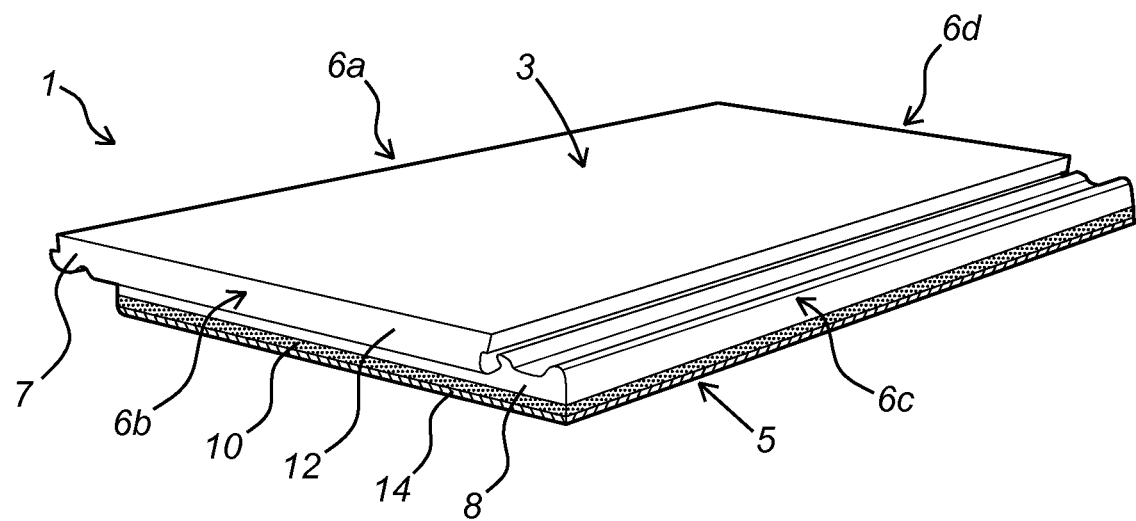
FIG. 1 shows in perspective a preferred embodiment of the panel according to the invention.

FIG. 1 shows a panel 1 suitable for assembling a waterproof floor or wall covering by interconnecting a plurality of said panels with each other, wherein the panel has a substantially planar top surface 3, and a substantially planar bottom surface 5, at least four substantially linear side edges 6a,6b,6c,6d comprising at least one pair of opposite side edges 6a,6c which are provided with interconnecting coupling means 7,8 for interconnecting one panel within another, the panel having a sandwich structure which comprises a core layer 10 basically composed of a foam material, a rigid top layer 12 and a backing layer 14.

Figure 2:
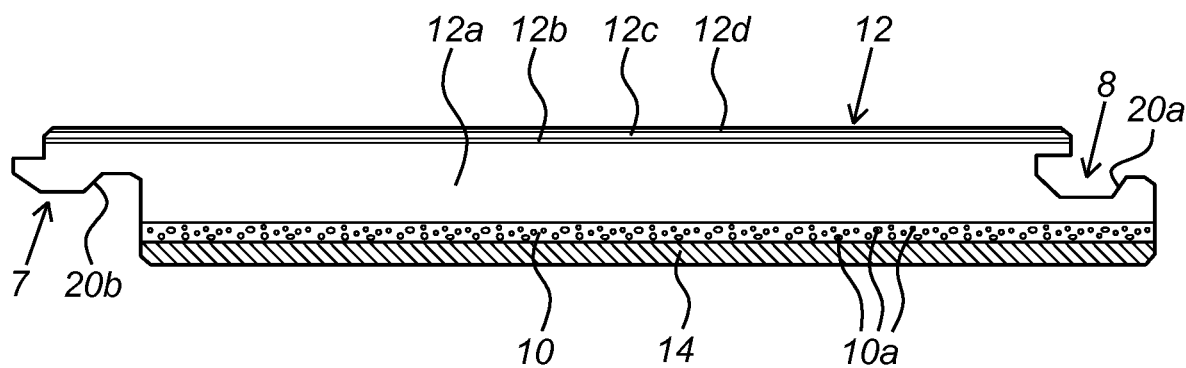
FIG. 2 shows a cross-section of the preferred embodiment of the panel according to the invention.

FIG. 2 shows the same embodiment as FIG. 1 in cross-section, wherein the interconnecting coupling means 7,8 comprise a tongue 7 and a groove 8, each having an interlocking feature 20a (a projection) and 20b (a recess) which avoids free movement of interconnected panels when the tongue of one panel is inserted in the groove of another neighbouring panel.

The core layer 10 is composed of a foam structure based on EVA, which has soft and flexible properties. The foam structure of the core layer 10 contains voids in the form of air pockets which are schematically depicted by small circles 10a.

The rigid top layer 12 comprises a support layer 12a, a décor layer 12b, a wear layer 12c, and a coating 12d. The support layer 12a is a rigid, high density PVC material that is free from plasticizer.

The backing layer 14 is composed of an extruded PVC material that is free from plasticizer, and consequently is rigid.

The shown thicknesses are roughly indicative for the actual thicknesses that are used in the panel of the invention. The overall thickness of the shown panel is approximately 6 mm.

FIGS. 3A-3D show several variants of the panel in regard of the design of the side edges 6a and 6c. The laminated structure of the layers in FIGS. 3A-3D are the same as that of layers 10, 12 and 14 as depicted in FIG. 2.

Figure 3A:
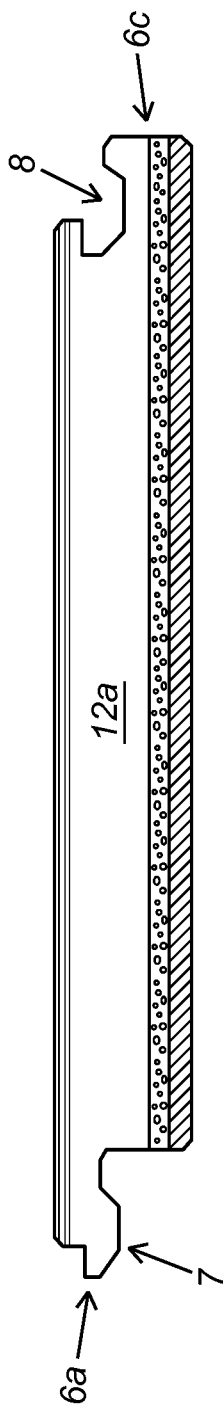
FIGS. 3A, 3B, 3C, and 3D show a cross-section of several variants of the panel according to the invention.
Figure 3B:
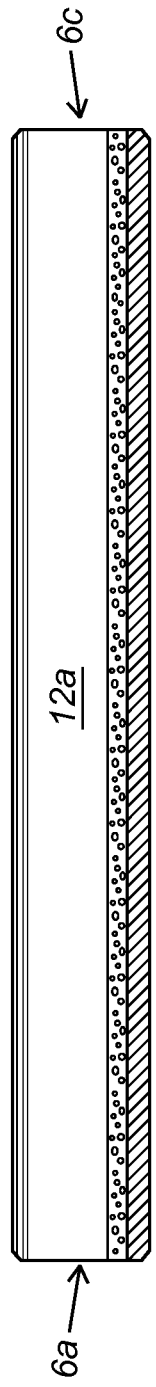
Figure 3C:
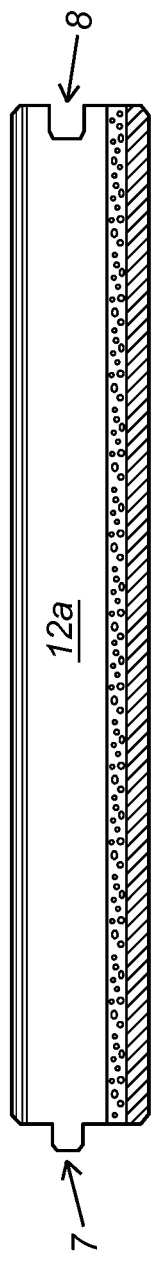

FIG. 3A shows a design of side edges 6a and 6c as depicted in FIG. 2 which allows for an interlocking of two complementary side edges by an angling-in movement;

FIG. 3B shows a design of side edges 6a and 6c being simply a flat surface, wherein the side edges may be interlocked by applying an adhesive material on the contacting side edges of neighbouring panels;

FIG. 3C shows a design of side edges 6a and 6c being provided with a classic groove 8 and tongue 7 design, which requires a horizontal shifting movement to interconnect two panels.

Figure 3D:
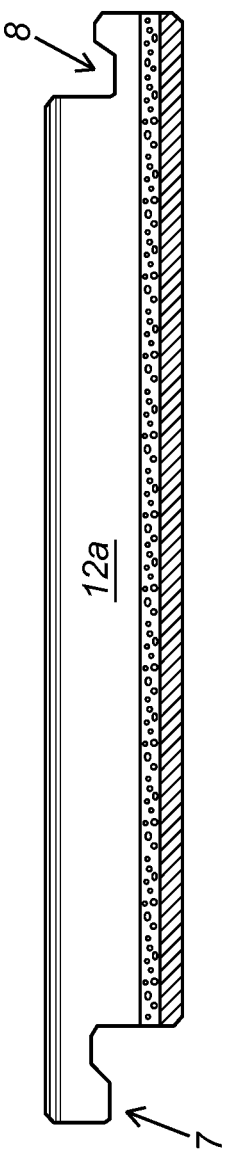

FIG. 3D shows a design of side edges 6a and 6c being provided with another classic groove 8 and tongue 7 design, that allows for interconnection by a vertical or drop-down movement.

Importantly, in all the above tongue and groove designs shown, both types of interconnecting coupling means form an integral part of the support layer 12a.

Figure 4:
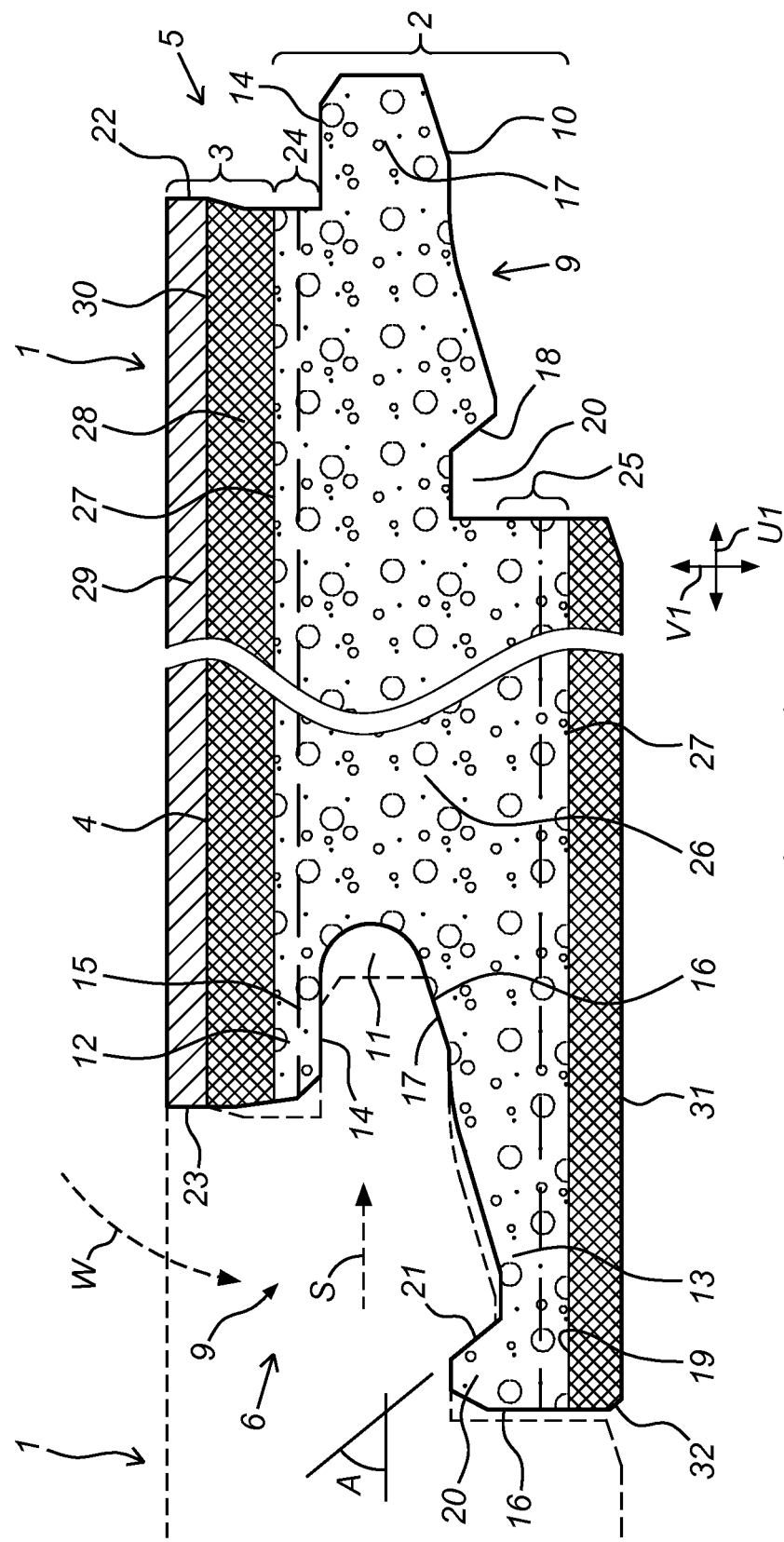
FIG. 4 shows a cross-section of a panel as proposed in relevant prior art.

FIG. 4 shows a cross-section of a panel as proposed in relevant prior art, for comparative reasons and in connection to the comparative example given below.

Comparative Example

The advantageous technical effect of the invention will be further substantiated with reference to the following comparative example:

Example I

WPC Flooring Product (Prior Art)

A so-called WPC flooring panel was produced in line with the disclosure of U.S. Pat. No. 9,212,494, and attached FIG. 4.

Essentially, the core layer of foam material forms the main layer of the panel for constituting more than half the total thickness of the panel (in line with FIG. 4). Furthermore, the tongue and groove profiles are an integral part of the core layer. The density of the core layer is approx. 750 kg/m3.

The top layer provided on the core layer of foam material, is more dense and has a density of 1600 to 1800 kg/m3 which is above the value of the core layer.

The backing layers consisted of an EVA and PE cushion layer with a density of approx. 200 kg/m3.

Example II

Panel According to the Invention

A specimen panel according to the invention and as depicted in FIG. 2, was produced having the following properties:

Support Layer:
Made from PVC that is virtually free from plasticizer and contains CaCO3 as filler material, wherein CaCO3 is present in a wt. % content of 60.
thickness of 2.5 to 3.0 mm.
density of 1800 to 2000 kg/m3
rigid, solid properties Core Layer:
Made from EVA, PE or PS foam
Thickness of 0.8 to 1.5 mm
Density of 100 to 300 kg/m3
Soft, flexible properties Backing Layer:
Made from PVC that is virtually free from plasticizer and contains CaCO3 as filler material, wherein CaCO3 is present in a wt. % content of 60.
thickness of 0.8 to 2.0 mm.
density of at least 1600 kg/m3
rigid, solid properties Common Features Both panel I and II, were provided with similar finishing layers on its top surface, i.e. a coating, a wear layer, and a décor layer. The materials used were also similar and are commonly used in the art.

Comparative Tests

Both panels were subjected to the following tests:

acoustic tests; in accordance with the following standards:
ISO 10140-1, ISO 717-2, ASTME2179-03, ASTME989-06.

indentation tests; in accordance with the following standards:
ASTM 1914.

Rigidity tests; in accordance with the following standards:
EN 310.

The below table shows the results that were obtained by the above tests.

| | Acoustic performance | | Indentation performance | Rigidity |
|---|---|---|---|---|
| Test name | Improvement of impact sound | Reducing of impact sound | Residual indentation | Modulus of elasticity |
| Test norms | ISO 10140-1, ISO 717-2 | ASTME2179-03, ASTME989-06 | ASTM 1914 | EN 310 |
| Test results value | ΔLw | ΔIIC | | MOE |
| Example II (Invention) | 21 dB-22 dB | 25 dB-26 dB | 1%-5% | 3000-6000 N/mm2 |
| Example I (prior art) | 21-22 dB | 25 dB-27 dB | 8%-25% | 800-2000 N/mm2 |

From the above table, one derives directly that the panel according to the invention achieves not only adequate acoustic properties, but in addition also has satisfactorily values in terms of both indentation resistance and rigidity.

For combining all these three properties to an adequate extent, the invention is arguably an improvement over the prior art, which in contrast shows inadequate values both in terms of indentation resistance and rigidity.

The invention claimed is:

1. A panel suitable for assembling a waterproof floor or wall covering from a plurality of panels, wherein the panel has a substantially planar top surface, and a substantially planar bottom surface, the panel having a laminated structure of layers which comprises:
a flexible core layer which is substantially composed of a material which is provided with voids in the form of air pockets and hence is relatively low in density, and
a rigid top layer which comprises a support layer that is substantially composed of a material that is virtually devoid of air pockets and hence is relatively high in density,
wherein the core layer has a lower density than the top layer,
wherein a thickness of the core layer is smaller than a thickness of the support layer, in a ratio of 0.5 or less, and
wherein the support layer comprises a thermoplastic material, wherein the material of the support layer is PVC that is virtually free from plasticizer and contains CaCO3 as filler material.

2. The panel according to claim 1, wherein the support layer is directly or indirectly provided onto a top side of the core layer.

3. The panel according to claim 1, wherein the core layer has a thickness in the range of 0.5 to 3.0 mm.

4. The panel according to claim 1, wherein the support layer has a thickness in the range of 2.0 to 8.0 mm.

5. The panel according to claim 1, wherein the core layer has a density of 100-300 kg/m3.

6. The panel according to claim 1, wherein the support layer has a density of at least 1200 kg/m3.

7. The panel according to claim 1, wherein the panel has an overall rigidity of at least 2000 N/mm2 when measured according to the standard EN310.

8. The panel according to claim 1, wherein the material of the core layer comprises a foam material from polyethylene, ethylene-vinyl acetate, polystyrene, polypropylene, polyurethane, or melamine, or alternatively cork.

9. The panel according to claim 1, wherein the top layer comprises a wear layer and a décor layer on top of the support layer.

10. The panel according to claim 9, wherein the wear layer is provided with a coating.

11. The panel according to claim 1, wherein a bottom side of the core layer is directly or indirectly provided with a backing layer.

12. The panel according to claim 1, wherein the panel has at least four substantially linear side edges having a rectangular design.

13. The panel according to claim 12, wherein the linear side edges comprise at least one pair of opposite side edges which are provided with interconnecting coupling means for interconnecting one panel within another.

14. The panel according to claim 13, wherein the interconnecting coupling means comprise a tongue and a groove wherein the tongue is provided on one side edge of one pair of opposite side edges, and the groove is provided on an other side edge of the same pair of opposite side edges.

15. The panel according to claim 13, wherein the interconnecting coupling means are provided as an integral part of the support layer.

16. The panel according to claim 1, wherein the core layer and/or the support layer is an extruded sheet material.

17. The panel according to claim 1, wherein CaCO3 is present in a wt. % content of 60.

18. A waterproof floor or wall covering composed of a plurality of assembled panels, wherein the panels have a substantially planar top surface, and a substantially planar bottom surface, the panels having a laminated structure of layers which comprises a flexible core layer which is substantially composed of a material which is provided with voids in the form of air pockets and hence is relatively low in density, and a rigid top layer which comprises a support layer that is substantially composed of a material that is virtually devoid of air pockets and hence is relatively high in density, and wherein the core layer has a lower density than the top layer, wherein a thickness of the core layer is smaller than a thickness of the support layer in a ratio of 0.5 or less, and wherein the support layer comprises a thermoplastic material, wherein the material of the support layer is PVC that is virtually free from plasticizer and contains CaCO$_3$ as filler material.

19. A method of producing a panel suitable for assembling a waterproof floor or wall covering from a plurality of panels, wherein the panel has a substantially planar top surface, and a substantially planar bottom surface, the method comprising the steps of:
   a) providing a flexible core layer which is substantially composed of a material which is relatively low in density and is provided with voids in the form of air pockets;
   b) providing a rigid top layer which comprises a support layer that is substantially composed of a material that is relatively high in density which is virtually devoid of air pockets, wherein the support layer comprises a thermoplastic material, wherein the material of the support layer is PVC that is virtually free from plasticizer and contains CaCO3 as filler material;
   c) adhering the rigid top layer to the top side of the core layer by applying an adhesive at the interface of the core and top layer;
wherein a thickness of the core layer is smaller than a thickness of the support layer in a ratio of 0.5 or less.

* * * * *